US012658615B2

(12) United States Patent
Hu et al.

(10) Patent No.: US 12,658,615 B2
(45) Date of Patent: Jun. 16, 2026

(54) RELIABLE ELECTRICAL CONNECTOR AND ELECTRONIC SYSTEM THEREOF

(71) Applicant: Amphenol Commercial Products (Chengdu) Co., Ltd., Chengdu (CN)

(72) Inventors: Xiaodong Hu, Chengdu (CN); Xiaoxiang Deng, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 309 days.

(21) Appl. No.: 18/475,494

(22) Filed: Sep. 27, 2023

(65) Prior Publication Data

US 2024/0113457 A1 Apr. 4, 2024

(30) Foreign Application Priority Data

Sep. 30, 2022 (CN) ........................ 202222622007.X

(51) Int. Cl.
*H01R 12/71* (2011.01)
*H01R 13/24* (2006.01)
(Continued)

(52) U.S. Cl.
CPC ........ *H01R 12/712* (2013.01); *H01R 13/2492* (2013.01); *H01R 13/502* (2013.01); *H01R 24/60* (2013.01); *H01R 2107/00* (2013.01)

(58) Field of Classification Search
CPC .. H01R 12/712; H01R 13/74; H01R 13/2492; H01R 13/502; H01R 24/60
(Continued)

(56) References Cited

U.S. PATENT DOCUMENTS 10,439,317 B2 * 10/2019 Horchler ................ H01R 12/79
11,791,585 B2 10/2023 Muha et al.
(Continued)

FOREIGN PATENT DOCUMENTS

JP H11111382 A * 4/1999 ........... H01R 13/748
WO WO 2016/044042 A1 3/2016
(Continued)

OTHER PUBLICATIONS

JP-H11111382-A original and translated (Year: 1999).*

*Primary Examiner* — Abdullah A Riyami
*Assistant Examiner* — Amara Anderson
(74) *Attorney, Agent, or Firm* — Wolf, Greenfield & Sacks, P.C.

(57) ABSTRACT

Reliable electrical connectors that enable simple architectures for systems in which connections are made through an opening of a casing. A connector may have a housing with an inner portion and an outer portion at least partially surrounding the inner portion. The inner portion may have first and second mating interfaces. The connector may have conductive elements each with first and second mating ends disposed in the first and second mating interfaces respectively. Intermediate portions of the conductive elements may be held by the inner portion of the housing to provide sealed electrical paths between the first mating interface and the second mating interface. The outer portion may be mounted against the casing with the first mating interface inside and second mating interface outside. The outer portion may have a support member embedded therein to improve its strength for an improved seal to the casing.

20 Claims, 10 Drawing Sheets

(51) Int. Cl.

| | |
|---|---|
| ***H01R 13/502*** | (2006.01) |
| ***H01R 24/60*** | (2011.01) |
| ***H01R 107/00*** | (2006.01) |

(58) Field of Classification Search

USPC .............................................................. 439/55

See application file for complete search history.

(56) References Cited

U.S. PATENT DOCUMENTS

| | | | | |
|---|---|---|---|---|
| 2006/0116008 | A1* | 6/2006 | Chen .................... | H01R 12/716<br>439/74 |
| 2018/0301830 | A1* | 10/2018 | Hoyack .................. | H01R 12/73 |
| 2023/0246391 | A1* | 8/2023 | Holub .................. | H01R 13/512<br>439/607.01 |
| 2024/0014592 | A1 | 1/2024 | Maddens et al. | |

FOREIGN PATENT DOCUMENTS

| | | | |
|---|---|---|---|
| WO | WO 2019/071119 | A1 | 4/2019 |
| WO | WO 2021/154779 | A1 | 8/2021 |

* cited by examiner

RELIABLE ELECTRICAL CONNECTOR AND ELECTRONIC SYSTEM THEREOF

RELATED APPLICATION

This application claims priority to and the benefit of Chinese Patent Application Serial No. 202222622007.X, filed on Sep. 30, 2022, entitled "INTEGRATED ELECTRICAL CONNECTOR AND ELECTRONIC SYSTEM," which is herein incorporated by reference in its entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining an assembly inside a sealed casing with an assembly outside the casing is to have one printed circuit board (PCB) serve as an interposer. The interposer has connectors mounted to both sides, to support separable connections inside and outside the casing. That PCB may also block an opening through the casing to seal the inside of the casing. To support this configuration, the PCB may have contact pads on opposite surfaces such that connectors may be mounted to the opposite surfaces of the PCB. Vias that extend through the PCB may electrically connect the contact pads on opposite surfaces so that signals may be routed between the connectors mounted to the opposite surfaces of the PCB. The assemblies inside and outside the casing may include flexible or rigid PCBs with connectors mounted on them. Those connectors may make separable connections with the connectors mounted on the interposer. In this way, signals may be routed between an assembly inside and outside the casing through the connectors and the interposer.

BRIEF SUMMARY

Aspects of the present application relate to a reliable, integrated electrical connector and electronic system thereof.

Some embodiments relate to an electrical connector. The electrical connector may include a housing including a divider with a first mating interface on a first side and second mating interface on a second side; and a plurality of conductive elements, each of the plurality of conductive elements including a first mating end disposed in the first mating interface, a second mating end disposed in the second mating interface, and an intermediate portion at least partially held by the divider such that the first mating interface and the second mating interface are sealed from each other at least partially by the divider.

Optionally, the housing includes an inner portion and an outer portion at least partially surrounding the inner portion such that the first mating interface and the second mating interface are disposed on opposite sides of the outer portion of the housing.

Optionally, for each of the plurality of conductive elements: each of the first mating end and the second mating end includes a bending portion bending away from a respective one of the first mating interface and the second mating interface.

Optionally, each of the plurality of conductive elements includes a straight body portion; the body portion includes a first portion and second portions extending from opposite ends of the first portion toward respective bending portions; and the second portions are narrower than the first portion.

Optionally, the second portions are embedded between the divider and a respective one of a first sidewall and a second sidewalls of the housing.

Optionally, for each of the plurality of conductive elements: the body portion includes third portions disposed between respective bending portions and second portions, and the third portions are recessed from the second portions.

Optionally, the inner portion of the housing includes first and second flanges protruding away from opposite sides of the plurality of conductive elements; and the outer portion of the housing includes an internal profile for being fixedly connected to the first and second flanges.

Optionally, the electrical connector may include a support member embedded in the outer portion of the housing.

Optionally, the inner portion of the housing includes a plurality of openings extending through a respective one of the first sidewall and the second sidewall; the plurality of openings of the inner portion of the housing are disposed corresponding to the first portions of the body portions of pairs of conductive elements of the plurality of conductive elements; and the outer portion of the housing includes corresponding portions that fill in the plurality of openings of the inner portion of the housing.

Some embodiments relate to an electrical connector. The electrical connector may include a plurality of conductive elements, each of the plurality of conductive elements including a first mating end and a second mating end opposite the first mating end; and a housing holding the plurality of conductive elements, the housing including a first sidewall, a second sidewall, a space between the first sidewall and the second sidewall, the space configured to receive mating components to the electrical connector, and an outer portion at least partially surrounding both the first sidewall and the second sidewall.

Optionally, the electrical connector may include a support member embedded in the outer portion of the housing.

Optionally, the support member includes a plurality of protrusions arranged at intervals along an outer edge and/or inner edge.

Optionally, the support member at least partially surrounds both the first sidewall and the second sidewall.

Optionally, the support member includes a single metal piece, or a plurality of separated metal pieces.

Optionally, the outer portion of the housing includes a plurality of projections and gaps between adjacent projections.

Optionally, a portion of the plurality of protrusions of the support member at least partially extending out of the outer portion of the housing through respective gaps.

Optionally, the plurality of conductive elements include a first plurality of conductive elements lining against the first sidewall, and a second plurality of conductive elements lining against the second sidewall.

Some embodiments relate to an electronic system. The electronic system may include a casing enclosing a space, the casing including a wall having an opening; and an electrical connector including a housing including an inner portion having a first mating interface disposed on a first side of the wall of the casing and a second mating interface on a second side of the wall of the casing, and an outer portion at least partially disposed on the wall of the casing.

Optionally, the wall of the casing includes a groove surrounding the opening; the electronic system includes a sealing member disposed in the groove and configured to hermetically seal an interface between the wall of the casing and the electrical connector; the sealing member is between the wall of the casing and the outer portion of the housing of the electrical connector; and a support member is at least partially embedded in the outer portion of the housing of the electrical connector.

Optionally, the electrical connector includes a plurality of conductive elements, each of the plurality of conductive elements including a first mating end disposed in the first mating interface, and a second mating end disposed in the second mating interface.

Optionally, the electronic system includes a printed circuit board disposed in the space of the casing, the printed circuit board electrically connected to the second mating ends of the plurality of conductive elements through respective first mating ends of the plurality of conductive elements.

Some embodiments relate to an electrical connector. The electrical connector may be configured for making connections through an opening in a casing. The electrical connector may comprise: a plurality of conductive elements, wherein the plurality of conductive elements may be used to electrically connect to a port of an electronic device, the plurality of conductive elements may comprise a first plurality of conductive elements and a second plurality of conductive elements arranged opposite to the first plurality of conductive elements, each of the first plurality of conductive elements and the second plurality of conductive elements comprises a plurality of terminals arranged in the form of a terminal array, and comprises a first mating end, a second mating end, and an intermediate portion, wherein the intermediate portion extends between the first mating end and the second mating end and connects the first mating end to the second mating end; and a housing which may be used to accommodate the plurality of conductive elements, wherein the housing may comprise: an inner portion of the housing molded with the first plurality of conductive elements and the second plurality of conductive elements as an integrated piece, and an outer portion of the housing sleeved to an outer side of the inner portion of the housing for mounting the electrical connector to a component to which it is applied, wherein the inner portion of the housing may have a sidewall extending in a vertical direction and defining an slot inside, and a divider extending in a direction perpendicular to the vertical direction and connected to the sidewall, wherein the divider divides the slot into a first slot and a second slot arranged in the vertical direction, the first plurality of conductive elements is embedded between a first sidewall and the divider, of the inner portion of the housing, and the second plurality of conductive elements is embedded between a second sidewall opposite to the first sidewall and the divider, of the inner portion of the housing, the first mating end of the first plurality of conductive elements and the first mating end of the second plurality of conductive elements are exposed to the first slot, and the second mating end of the first plurality of conductive elements and the second mating end of the second plurality of conductive elements are exposed to the second slot.

Optionally, the first mating end and the second mating end of each of the first plurality of conductive elements and the second plurality of conductive elements may have a bending portion bending away from the slot in a direction perpendicular to the vertical direction, wherein the bending portion of the first mating end of the first plurality of conductive elements is shaped to form a positive fit with a first proximal end of the first sidewall located proximally in the vertical direction and the bending portion of the second mating end of the first plurality of conductive elements is shaped to form a positive fit with a first distal end of the first sidewall located distally in the vertical direction, and the bending portion of the first mating end of the second plurality of conductive elements is shaped to form a positive fit with a second proximal end of the second sidewall located proximally in the vertical direction and the bending portion of the second mating end of the second plurality of conductive elements is shaped to form a positive fit with a second distal end of the second sidewall located distally in the vertical direction.

Optionally, each conductive element in the plurality of conductive elements may be shaped into a long rib-shaped plate comprising a body portion extending in the vertical direction and bending portions bending at opposite ends of the body portion, the bending portions bend away from the slot in a direction perpendicular to the vertical direction.

Optionally, the body portion may comprise a first portion located in the middle portion of the body portion and second portions respectively extending in a tapered manner from opposite ends of the first portion toward the bending portion and connected with the bending portion, wherein a gap is formed between the second portions of two adjacent conductive elements of each of the first plurality of conductive elements and the second plurality of conductive elements, and the divider of the inner portion of the housing passes through the gap to be connected to the sidewall.

Optionally, a third portion may be provided between the bending portion and the second portion of each conductive element, and the third portion is configured to be recessed in the same direction as the bending portion in a direction perpendicular to the vertical direction.

Optionally, an outer side of the sidewall of the inner portion of the housing may further be formed with at least one flange protruding outward from the sidewall in a direction away from the slot, and the outer portion of the housing is configured to have an internal profile having a shape that forms a positive with the at least one flange.

Optionally, the at least one flange may be configured to have a plurality of steps staggered in the vertical direction.

Optionally, a reinforcement support member may be embedded in the outer portion of the housing.

Optionally, the support member may comprise a single-piece metal member or a plurality of metal members independent of each other.

Optionally, the support member may be configured with an shape and provided with tooth-shaped protrusions arranged at intervals on the outer and/or inner peripheral edges of the support member.

Optionally, a opening for the conductive element may be provided on a central portion of each of the first sidewall and the second sidewall of the inner portion of the housing in the vertical direction, and the opening extends through the first sidewall and the second sidewall such that the conductive elements of the first plurality of conductive elements and the second plurality of conductive elements are accessible from the exterior of the first sidewall and the second sidewall accordingly.

Optionally, the inner portion of the housing and the outer portion of the housing may be made of a resin material.

Some embodiments relate to an electronic system. The electronic system may comprise: the electrical connector described herein; a case which may comprise an upper wall, a lower wall and a sidewall defining a space for receiving the electrical connector, the lower wall of the case is provided thereon with an opening and an groove around the opening; a sealing member which may be provided in the groove; and a printed circuit board which may be electrically connected to the first mating ends of the first plurality of conductive elements and the second plurality of conductive elements in the first slot of the electrical connector; wherein the electrical connector may be mounted within the opening and hermetically mounted on the lower wall of the case by the sealing member provided in the groove, and the second slot of the electrical connector is exposed to the exterior of the case through the opening.

Some embodiments relate to a method for manufacturing an electrical connector described herein. The method may comprise: providing a plurality of conductive elements which may comprise arranging a plurality of conductive elements in the form of a conductive element array to form a first plurality of conductive elements and a second plurality of conductive elements arranged opposite to the first plurality of conductive elements, such that each of the first plurality of conductive elements and the second plurality of conductive elements comprises a first mating end, a second mating end, and an intermediate portion extending and connecting between the first mating end and the second mating end; molding an inner portion of the housing based on the plurality of conductive elements by injection molding, such that the inner portion of the housing is shaped to have a sidewall extending in the vertical direction and defining an internal space inside, and a divider extending in a direction perpendicular to the vertical direction and connecting with the sidewall so as to divide the slot into a first slot and a second slot in a direction perpendicular to the vertical direction, and the first plurality of conductive elements is embedded between a first sidewall and the divider, of the inner portion of the housing, and the second plurality of conductive elements is embedded between a second sidewall opposite to the first sidewall and the divider, of the inner portion of the housing, a first mating end of the first plurality of conductive elements and a first mating end of the second plurality of conductive elements are exposed to the first slot, and a second mating end of the first plurality of conductive elements and a second mating end of the second plurality of conductive elements are exposed to the second slot; and molding an outer portion of the housing at an outer side of the inner portion of the housing by secondary injection molding, such that the outer portion of the housing is sleeved to the inner portion of the housing.

The method may comprise firstly providing two sets of conductive elements with a plurality of conductive elements arranged in an array, and then molding the housing based on the conductive elements by secondary injection molding. According to the above technical solution of the present application, the electrical connector can be made by injection molding only, without additional soldering and/or welding operation by the user during the subsequent application. This manufacturing method is simple and enables the shape of the housing to be easily changed as needed, thus increasing labor productivity, significantly reducing manufacturing costs and allowing for flexibly customized production according to user needs.

Optionally, providing a plurality of conductive elements may comprise configuring a bending portion bending away from the slot on the first mating end and the second mating end of each of the first plurality of conductive elements and the second plurality of conductive elements in a direction perpendicular to the vertical direction.

Optionally, molding an inner portion of the housing based on the plurality of conductive elements by injection molding may comprise: configuring the end of the first sidewall of the inner portion of the housing located proximally in the vertical direction to have a first proximal end having a shape that forms a positive fit with the bending portion of the first mating end of the first plurality of conductive elements; configuring the end of the first sidewall of the inner portion of the housing located distally in the vertical direction to have a first distal end having a shape that forms a positive fit with the bending portion of the second mating end of the first plurality of conductive elements; configuring the end of the second sidewall of the inner portion of the housing located proximally in the vertical direction to have a second proximal end having a shape that forms a positive fit with the bending portion of the first mating end of the second plurality of conductive elements, and configuring the end of the second sidewall of the inner portion of the housing located distally in the vertical direction to have a second distal end having a shape that forms a positive fit with the bending portion of the second mating end of the second plurality of conductive elements.

Optionally, providing a plurality of conductive elements may comprise shaping each terminal of each of the first plurality of conductive elements and the second plurality of conductive elements into a long rib-shaped plate comprising a body portion extending in the vertical direction and bending portions bending at opposite ends of the body portion, the bending portions are bent away from the slot in a direction perpendicular to the vertical direction.

Optionally, providing a plurality of conductive elements may further comprise configuring the body portion to have a first portion located in the middle portion of the body portion and second portions extended in a tapered manner from opposite ends of the first portion toward the bending portion respectively and connected with the bending portion.

Optionally, providing a plurality of conductive elements may further comprise configuring a third portion between the bending portion and the second portion of each conductive element, and the third portion is recessed in the same direction as the bending portion in a direction perpendicular to the vertical direction.

Optionally, molding the inner portion of the housing based on the plurality of conductive elements by injection molding may further comprise configuring at least one flange protruding outward from the sidewall in a direction away from the slot on an outer side of the sidewall of the inner portion of the housing.

Optionally, molding an outer portion of the housing on the outer side of the inner portion of the housing by secondary injection molding may further comprise providing a support member and embedding the support member in the outer portion of the housing during secondary injection molding.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
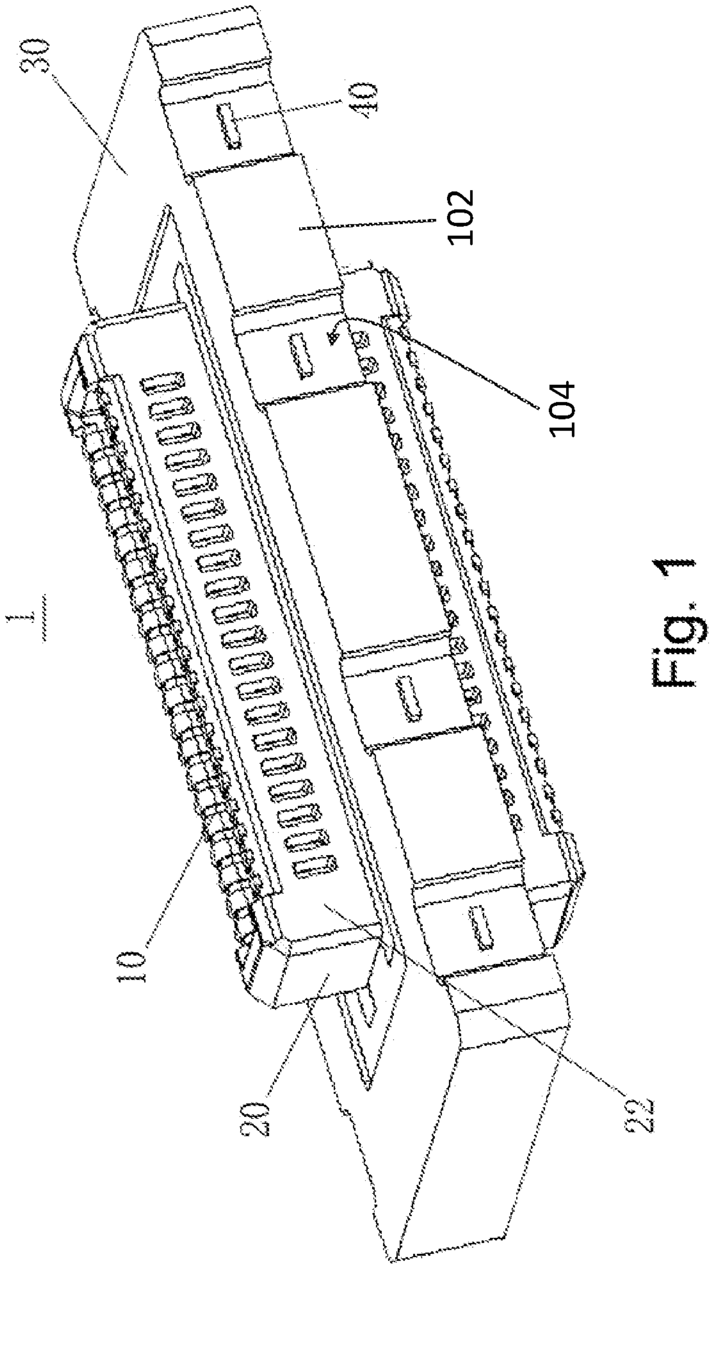
FIG. 1 is a perspective view of an electrical connector, according to some embodiments.

The inventors have recognized and appreciated designs for connectors that enable reliable connections between assemblies inside and outside of a casing with a simple system architecture. Connectors as described herein, for example, may avoid processing such as soldering connectors on a printed circuit board serving as an interposer. With a conventional configuration, two connectors would have to be mounted on opposite sides of a printed circuit board by processing such as soldering. This additional processing would consume extra time and lead to added cost and reliability risks. According to aspects of the present application, a connector can replace the printed circuit board and the two connectors mounted thereon, which may eliminate the additional processing required to mount the two connectors to the printed circuit board and may yield more reliable connections.

In some examples, a connector may have a housing with an inner portion and an outer portion at least partially surrounding the inner portion. The inner portion may have first and second mating interfaces separated from each other and configured to receive respective mating components to the connector. The connector may have conductive elements held by the inner portion of the housing. Each conductive element may have a first mating end disposed in the first mating interface and a second mating end disposed in the second mating interface. Intermediate portions of the conductive elements may be held by an insulative housing forming the inner portion to provide sealed conducting paths between the first and second mating interfaces. Either or both of the mating interfaces may be formed as a slot in the connector housing.

In some examples, an electronic system may have a casing (e.g., a hard disk drive casing) enclosing a space. The connector may be mounted in an opening through a wall of the casing, with a first mating interface on a first side of the wall and the second mating interface on a second side of the wall. The connector housing may have an outer portion, surrounding the inner portion of the connector housing. The outer portion may be mounted on a wall of the casing. The outer portion may be sealed against the wall, such as by pressing against a sealing member that surrounds the opening through the wall of the casing. For example, a hard disk drive assembly, which may include a printed circuit board with a connector mounted thereon, may be disposed in the casing and mated with the first mating interface. Another assembly such as a flexible circuit assembly, disposed outside the casing, may be mated with the second mating interface and connected to the hard disk drive assembly through the connector.

Such a connector may be simply and reliably formed by overmolding the inner portion on intermediate portions of a plurality of conductive elements. Overmolding may form a seal around the intermediate portions while leaving mating portions exposed for mating to mating components. The outer portion may be overmolded on the inner portion of the housing, forming a sealed interface between the outer and inner portions. The outer portion may be configured to parallel the wall of the casing when the connector is inserted into the opening to form a seal between the connector and the walls of the casing. The outer portion may be formed via insert molding in which one or more support members are embedded therein. The support members may be made of materials that are stronger than that of the housing, such as metal, and therefore improve the strength of the outer portion of the housing to sustain the pressing force that may be applied in order to mount the connector with a sealing member captured between the connector and a wall of the casing.

Referring to FIGS. 1 to 7, an electrical connector 1 according to some embodiments may comprise a plurality of conductive elements 10, an inner portion 20 of the housing, and an outer portion 30 of the housing sleeved to the inner portion 20 of the housing. The plurality of conductive elements 10 of the electrical connector 1 may be configured for electrically connecting to a port (not shown) of an electronic device. In some exemplary embodiments, a plurality of conductive elements may be arranged in a form of a conductive element array. The conductive element 10 may be molded integrally with the inner portion 20 and the outer portion 30 as an integrated piece. Optionally, the outer portion 30 may include a plurality of projections 102 and gaps 104 between adjacent projections 102.

Figure 2:
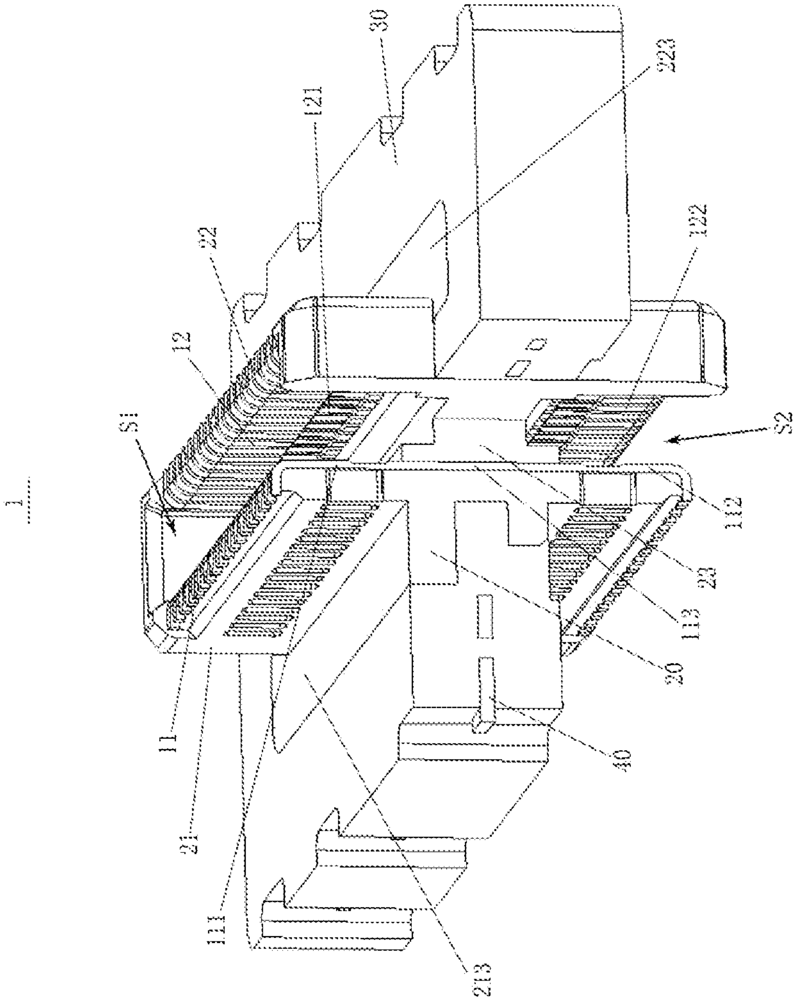
FIG. 2 is another perspective view of the electrical connector of FIG. 1, with a portion cutaway to illustrate the inside of the electrical connector.

As shown in FIGS. 1 and 2, the plurality of conductive elements 10 may comprise a first plurality of conductive elements 11 and a second plurality of conductive elements 12 arranged opposite to the first plurality of conductive elements 11. Each of the first plurality of conductive elements 11 and the second plurality of conductive elements 12 may comprise a plurality of conductive elements arranged in an array. In the illustrated embodiment, each conductive element of the first plurality of conductive elements 11 may have a first mating end 111, a second mating end 112, and an intermediate portion 113. As shown in FIG. 1, the intermediate portion 113 extends between the first mating end 111 and the second mating end 112 and connects the first mating end 111 to the second mating end 112. Each conductive elements of the second plurality of conductive elements 12 may have a first mating end 121, a second mating end 122, and an intermediate portion 123. The intermediate portion 123 extends between the first mating end 121 and the second mating end 122 and connects the first mating end 121 to the second mating end 122.

Referring to FIGS. 1 to 4, in the illustrated embodiment, the first plurality of conductive elements 11 and the second plurality of conductive elements 12 and the inner portion 20 of the housing are molded into a single, unitary component by a two-step injection molding process. The inner portion 20 of the housing may have a cylinder shape surrounded by sidewalls extending in a vertical direction, and a slot may be defined inside the inner portion 20 of the housing. The inner portion 20 of the housing may have a first sidewall 21, a second sidewall 22 opposite to the first sidewall 21, and two end sidewalls connecting the first sidewall 21 and the second sidewall 22. The inner portion 20 of the housing may further comprise a divider 23 extending in a direction substantially perpendicular to the vertical direction and connecting the first sidewall 21 and the second sidewall 22 and the two end sidewalls. As shown in FIG. 2, the divider 23 divides the space into a first slot S1 and a second slot S2 arranged in the vertical direction. The first slot S1 and the second slot S2 may be configured for electrical connecting with respective mating components. The first plurality of conductive elements 11 are disposed between the first sidewall 21 and the divider 23, and the second plurality of conductive elements 12 are disposed between the second sidewall 22 and the divider 23. The first mating end 111 of the first plurality of conductive elements 11 and the first mating end 121 of the second plurality of conductive elements 12 are exposed to the first slot S1. The second mating end 112 of the first plurality of conductive elements 11 and the second mating end 122 of the second plurality of conductive elements 12 are exposed to the second slot S2.

Figure 10:
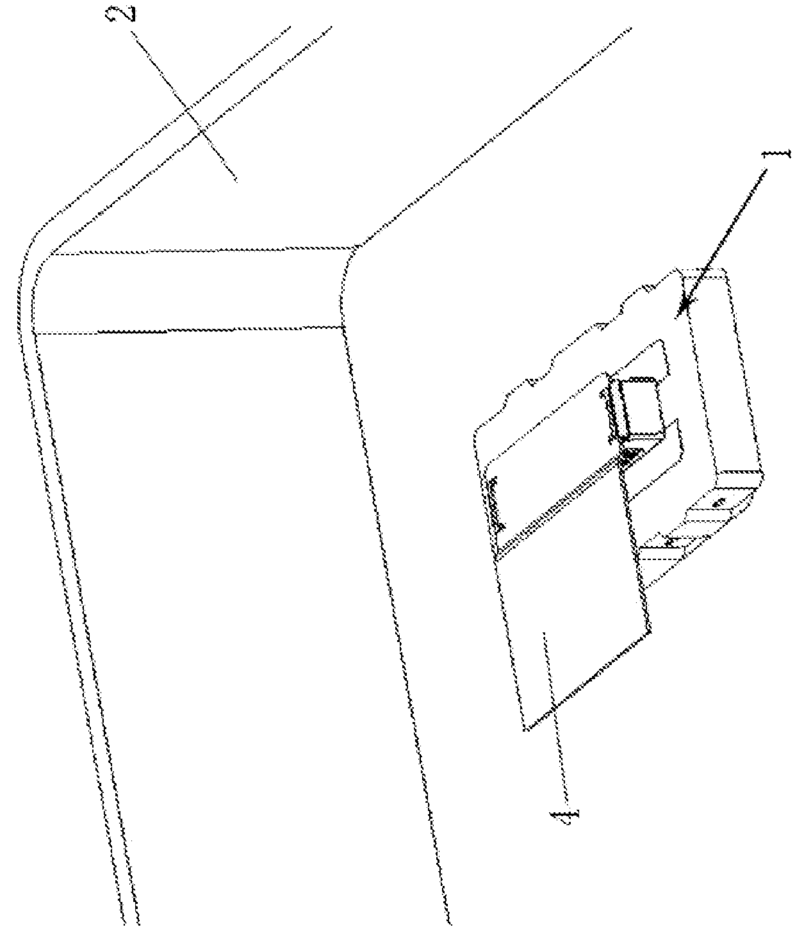
FIG. 10 is a perspective view of the system of FIG. 9, illustrating an electronic assembly mounted to the electrical connector of FIG. 1, according to some embodiments.

Optionally, in an application of the electrical connector 1, the first slot S1 may be located inside a case of the application component and can be electrically connected to, for example, a mating connector which can also be electrically connected to another circuit board. The second slot S2 may be located outside the case and used as a socket for ports of other electronic devices, such that the circuit board inside can be electrically connected to electronic devices outside, as schematically illustrated in FIG. 10. According to some embodiments, the application component may be, for example, a hard disk drive, and the case may be a hard disk case.

It should be appreciated that the term “proximal end” as used in the description of the present application may refer to the end that will be located inside the case when the electrical connector is used. The term “distal end” may refer to the end that will be located outside the case for insertion of external electronic devices when the electrical connector is used. In other words, the terms “proximal end” and “distal end” respectively indicate the opposite ends of the electrical connector when it is mounted on a case.

In the exemplary embodiment of the present application, the first mating end and the second mating end of each of the first plurality of conductive elements 11 and the second plurality of conductive elements 12 may have a bending portion bending away from the space in a direction substantially perpendicular to the vertical direction. As illustrated exemplarily in FIG. 4, the bending portion of the first mating end 111 of the first plurality of conductive elements 11 is shaped to form a positive fit with a first proximal end 211 of the first sidewall 21 located proximally in the vertical direction and the bending portion of the second mating end 112 of the first plurality of conductive elements 11 is shaped to form a positive fit with a first distal end 212 of the first sidewall 21 located distally in the vertical direction. The bending portion of the first mating end 121 of the second plurality of conductive elements 12 is shaped to form a positive fit with a second proximal end 221 of the second sidewall 22 located proximally in the vertical direction, and the bending portion of the second mating end 122 of the second plurality of conductive elements 12 is shaped to form a positive fit with a second distal end 222 of the second sidewall 22 located distally in the vertical direction. In this regard, both the first plurality of conductive elements 11 and the second plurality of conductive elements 12 are fixed in the vertical direction so as to prevent relative displacement of the plurality of conductive elements 11, 12 with respect to the inner portion 20 of the housing.

With the electrical connector 1 according to the exemplary embodiment of the present application, the plurality of conductive elements 10 may be molded integrally with the housing into an integrated piece, and two ends of the plurality of conductive elements 10 are spaced apart, with the divider 23 of the integrally molded inner portion 20 of the housing in between, such that two interfaces or sockets are formed at opposite ends of the electrical connector 1. Two ends of the plurality of conductive elements 10 can be used respectively as an interface or socket for electrical connection with other electronic devices. In this way, the integrated connector 1 of the present application is formed to have two interfaces for externally connecting an electronic device which can be obtained without soldering and/or welding and the corresponding processing. In addition, since the two interfaces are formed by the two ends of the plurality of conductive elements, the electrical connector 1 of the present application can achieve a simpler and more stable and reliable electrical connection than existing electrical connectors, which are electrically connected to each other by soldering and/or welding two separate conductive element components formed respectively in two housings to a board.

In some exemplary embodiments, each conductive element of the first plurality of conductive elements 11 and the second plurality of conductive elements 12 may be formed into a long rib-shaped plate. Each conductive element may comprise a straight body portion 50 extending in the vertical direction and bending portions 52, 53 bending at opposite ends of the body portiI0. The bending portions 52, 53 may bend away from the space in a direction substantially perpendicular to the vertical direction.

Figure 5:
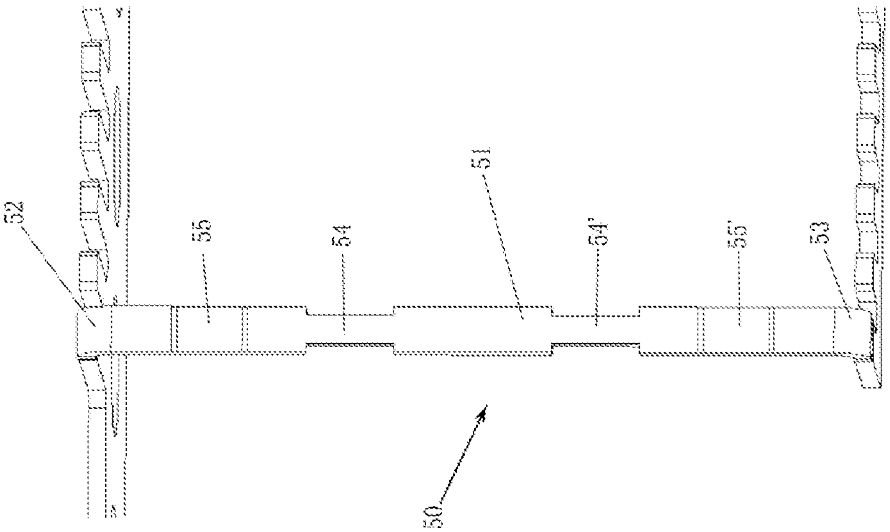
FIG. 5 is a perspective view of a conductive element of the electrical connector of FIG. 1.

Referring to FIG. 5, in the illustrated embodiment, the body portion 50 may comprise a first portion 51 and second portions 54, 54' extending from opposite ends of the first portion 51 toward respective bending portions. The second portions 54, 54' may be narrower than the first portion 51 such that the second portions 54, 54' may form gaps between adjacent conductive elements when the conductive elements are arranged as the first plurality of conductive elements 11 and second plurality of conductive elements 12. The divider 23 may be connected to the first sidewall 21 and the second sidewall 22, respectively, through the gap. The configuration of the second portions 54, 54' may enhance the connection between the divider 23 and the first sidewall 21 and the second sidewall 22, and may prevent relative displacement of the plurality of conductive elements 11, 12 with respect to the inner portion 20 of the housing in a direction perpendicular to the vertical direction.

In some exemplary embodiments, as shown in FIG. 5, the body portion 50 may include third portions 55, 55'. For each conductive element, a third portion 55 may be provided between the bending portion 52 and the second portion 54, and a third portion 55' may be provided between the bending portion 53 and the second portion 54' of each conductive element. The third portions 55, 55' may be recessed from the second portions 54, 54' in a direction substantially parallel to a bending direction of the bending portion. The third portions 55, 55' may act in cooperation with the ends of the sidewalls, thus acting synergistically to prevent relative displacement of the plurality of conductive elements 11, 12 in the vertical direction with respect to the inner portion 20 of the housing.

With the above exemplary technical solution, the risk of displacements of the first plurality of conductive elements 11 and/or the second plurality of conductive elements 12 in the vertical direction and the direction perpendicular to the vertical direction both can be reduced, such that the plurality of conductive elements 10 is more accurately and stably fixed in the inner portion 20 of the housing, thus improving the accuracy and reliability of the electrical connection in the electrical connector.

According to some optional exemplary embodiments of the present application, although only one conductive element is shown in FIG. 5, it should be appreciated that a second portion may be formed on the body portion 50 of one or more of the plurality of conductive elements of the plurality of conductive elements 10 arranged in a form of an array.

Figure 4:
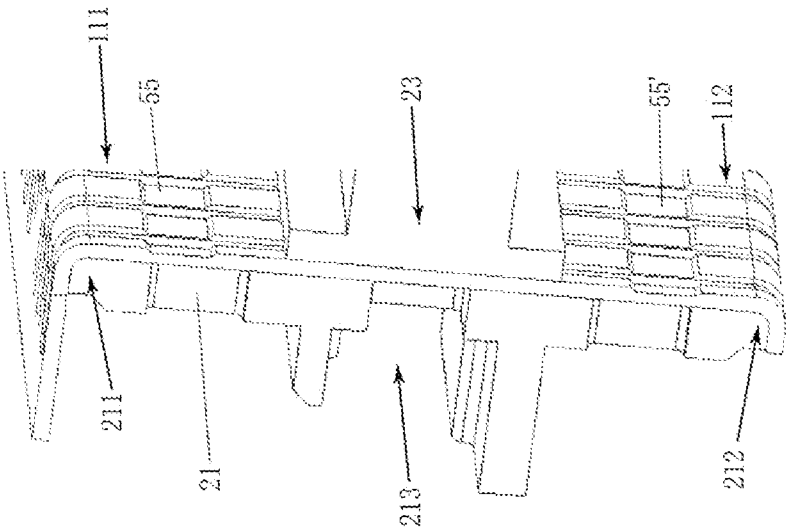
FIG. 4 is a perspective view of a portion of the electrical connector of FIG. 3, illustrating conductive elements disposed in an inner portion of the housing.

Referring to FIGS. 1, 2 and 4, in the illustrated embodiment, flanges 213, 223 are formed on the outer sides of both the first sidewall 21 and the second sidewall 22 of the inner portion 20 of the housing. The flanges 213, 223 may protrude outward from the corresponding sidewalls in directions away from the slot. The outer portion 30 may be sleeved to the outer side of the inner portion 20 of the housing, and the inner wall of the outer portion 30 of the housing may be accordingly contoured to fit the shape of the flanges 213, 223. Optionally, the flanges 213, 223 may be configured to have a plurality of steps staggered in the vertical direction. In the example shown in FIG. 2, the flanges 213, 223 may each have two steps, which may enable a more stable mutual cooperation between the inner portion 20 of the housing and the outer portion 30 of the housing, thus increasing the service life of the electrical connector 1.

Figure 6:
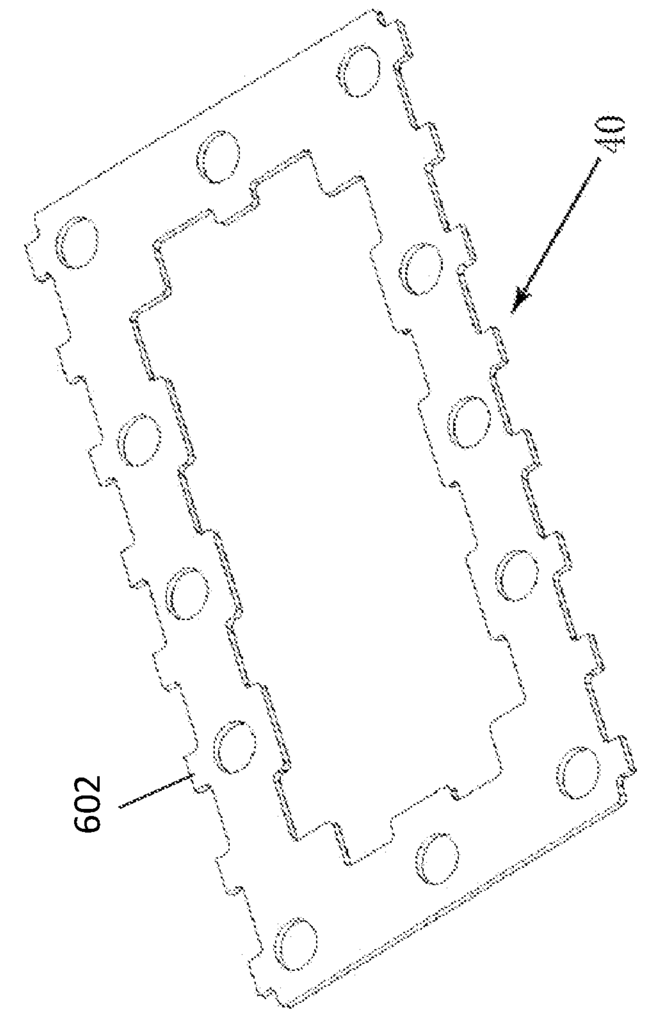
FIG. 6 is a perspective view of a support member of the electrical connector of FIG. 1 according to some embodiments.
Figure 7:
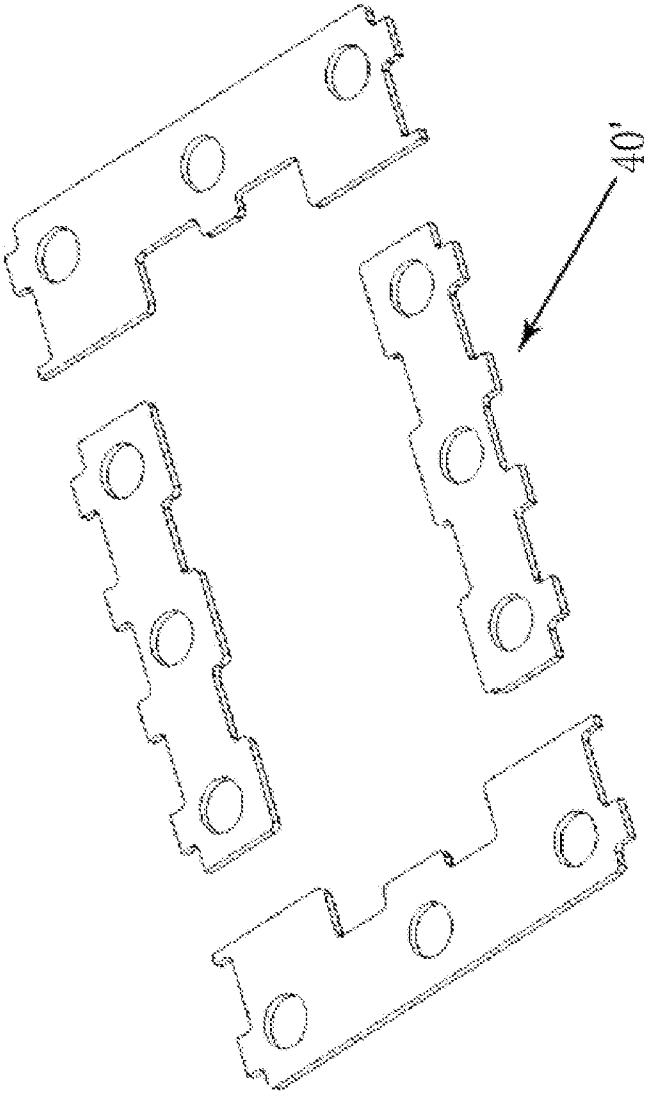
FIG. 7 is a perspective view of a support member of the electrical connector of FIG. 1, according to some embodiments.

In some embodiments, a support member may be embedded in the outer portion 30 of the housing. FIGS. 6 and 7 show exemplary support members 40, 40', respectively. As illustrated, a support member may be configured to substantially surround the inner portion 20 of the housing. As shown in FIG. 6, in some embodiments, the support member 40 may be configured as a single-piece frame member, which may comprise an integrated metal member. As shown in FIG. 7, in some embodiments, the support member 40' may comprise a plurality of metal members separated from each other, and the plurality of metal members may be combined to form a support member. Optionally, a plurality of hollow holes may be formed in the support members 40, 40'. Optionally, tooth-shaped protrusions 602 arranged at intervals may be formed on the outer and/or inner peripheral edges of the support members 40, 40', as shown in FIGS. 6 and 7. The arrangements of the hollow holes and/or the tooth-shaped protrusions can be used to improve the stability of embedding the support members 40, 40' in the outer portion 30 of the housing.

According to the above exemplary technical solutions, the embedded support member may not be easily displaced. The overall rigidity of the electrical connector 1 can be improved, while the overall weight of the electrical connector 1 may be reduced, with the support member embedded in the outer portion of the housing and comprising hollow holes and/or tooth-shaped protrusions.

Optionally, at least a portion of the edge portions of the support member 40, 40' may protrude to the exterior of the outer portion 30 of the housing, as shown in FIGS. 1 and 2. A portion of the plurality of protrusions 602 of the support member 40, 40' may at least partially extend out of the outer portion 30 of the housing through respective gaps 104. The protruding portions may be used as a functional extension to the electrical connector 1.

Figure 3:
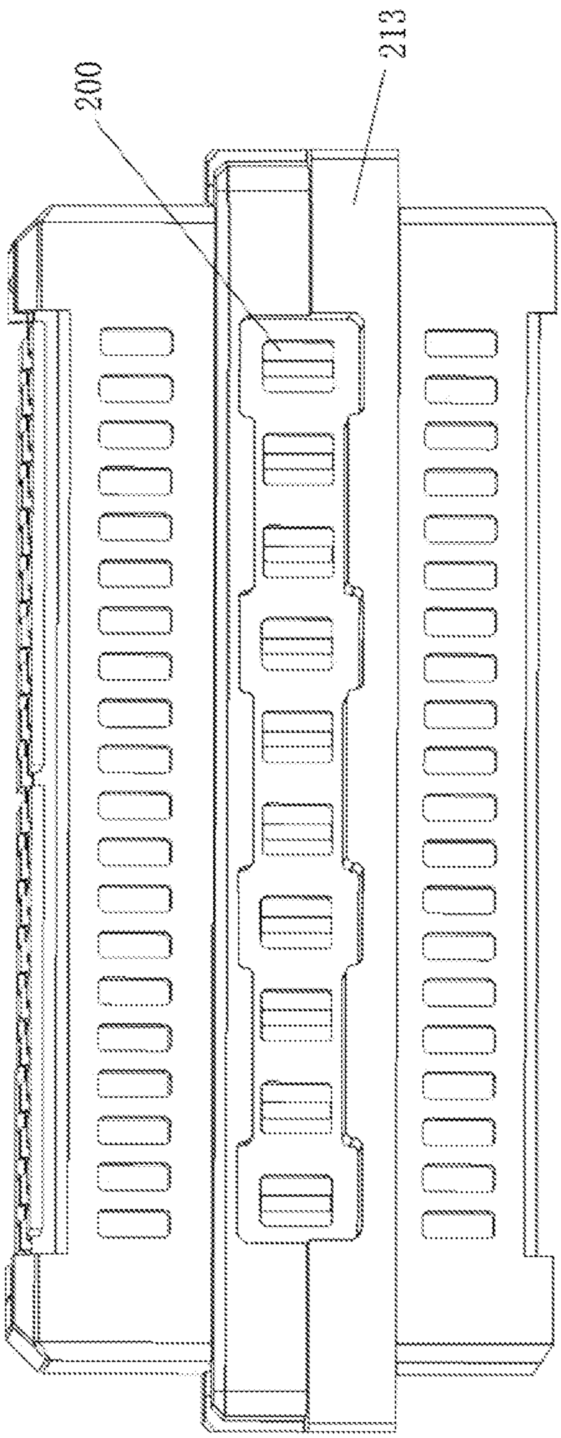
FIG. 3 is a front view of the electrical connector of FIG. 1, with an outer portion of the housing hidden.

As illustrated in FIG. 3, openings 200 may be provided on a central portion of each of the first sidewall 21 and the second sidewall 22 in the vertical direction for positioning the conductive element during the molding process. The openings 200 may extend through the first sidewall 21 and the second sidewall 22 such that conductive elements in the first plurality of conductive elements 11 and the second plurality of conductive elements 12 are accessible from the exterior of the first sidewall 21 and the second sidewall 22 accordingly.

It should be appreciated that each of the first sidewall 21 and the second sidewall 22 may be provided with a plurality of openings 200. The plurality of openings 200 may be arranged parallel to each other, corresponding to the direction that conductive element are spaced apart from each other.

In some embodiments, both the inner portion 20 of the housing and the outer portion 30 of the housing may be molded from may be dielectric members molded from a dielectric material such as plastic or nylon. Examples of suitable materials include, but are not limited to, liquid crystal polymer (LCP), polyphenylene sulfide (PPS), high temperature nylon or polyphenylenoxide (PPO) or polypropylene (PP). Other suitable materials may be employed, as aspects of the present application are not limited in this regard.

Figure 9:
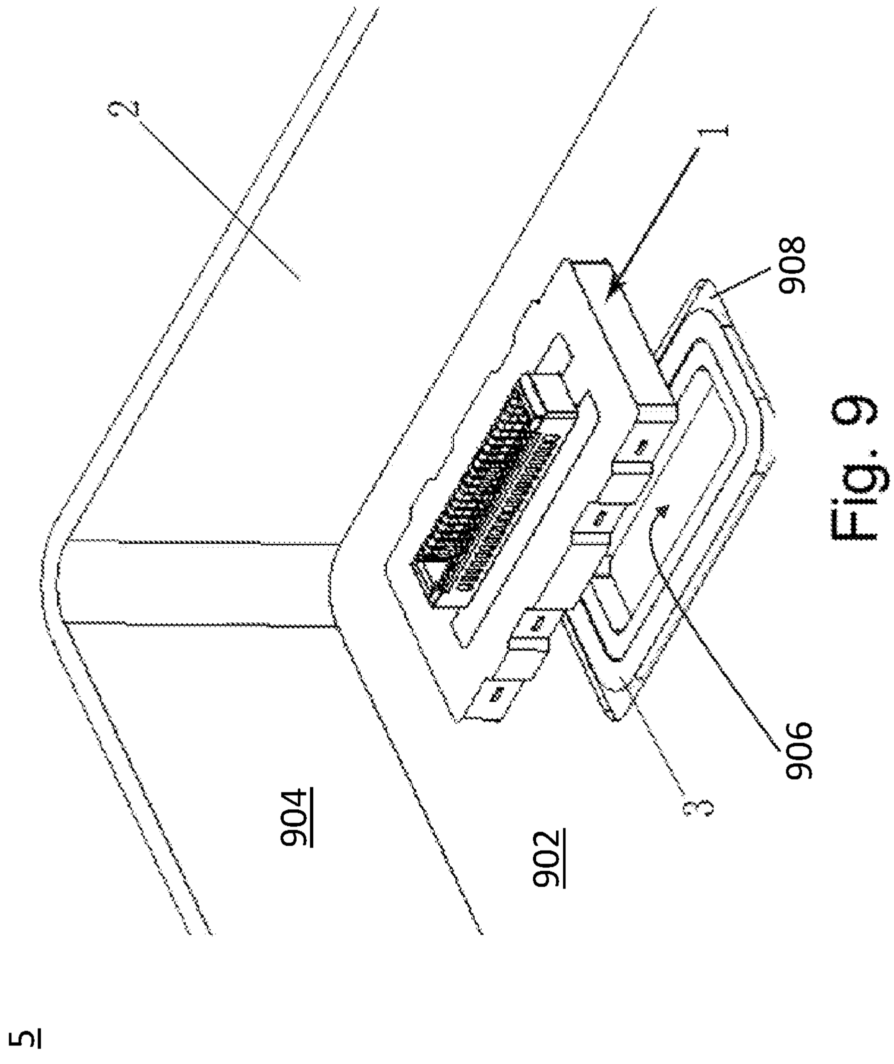
FIG. 9 is a partially exploded perspective view of a system with the electrical connector of FIG. 1, according to some embodiments.

FIGS. 9, 10 show an electronic system 5 that can include the electrical connector 1. the electronic system 5 comprises the electrical connector 1, a case 2, and a printed circuit board 4. The case 2 may comprise an upper wall, a lower wall 902, and a sidewall 904, which may define a space for receiving the electrical connector 1. The lower wall of the case 2 may include an opening 906 and a groove 908 around the opening. A sealing member 3 may be disposed in the groove for increasing air tightness. The printed circuit board 4 may be electrically connected to the first mating ends of the first plurality of conductive elements 11 and the second plurality of conductive elements 12 in the first slot S1 of the electrical connector. The electrical connector 1 may be hermetically mounted to the lower wall 902 of the case 2 by the sealing member 3 provided in the groove. The second slot S2 of the electrical connector 1 may be exposed to the exterior of the case 2 through the opening 906.

Optionally, the case 2 may be, for example, a case of a hard disk drive, and the printed circuit board may be, for example, an FPC.

Optionally, the sealing member 3 may be configured as a resilient gasket or an epoxy sealant.

With such a configuration, a user may simply press the electrical connector 1 into the opening 906 in the lower wall 902 from the interior of the case 2 so as to establish the electrical connections between the interior and exterior of the case can be implemented. Such a configuration replaces conventional soldering and/or welding of the conductive elements and wiring by the user with a simple plug-in insertion, which significantly simplifies the mounting process and reduces mount cost. The cost in time for mounting may be saved. A simpler, more compact and reliable structure of the electronic system may be achieved. User experience may be improved, compared to conventional configurations that require soldering and/or welding during assembling.

Figure 8:
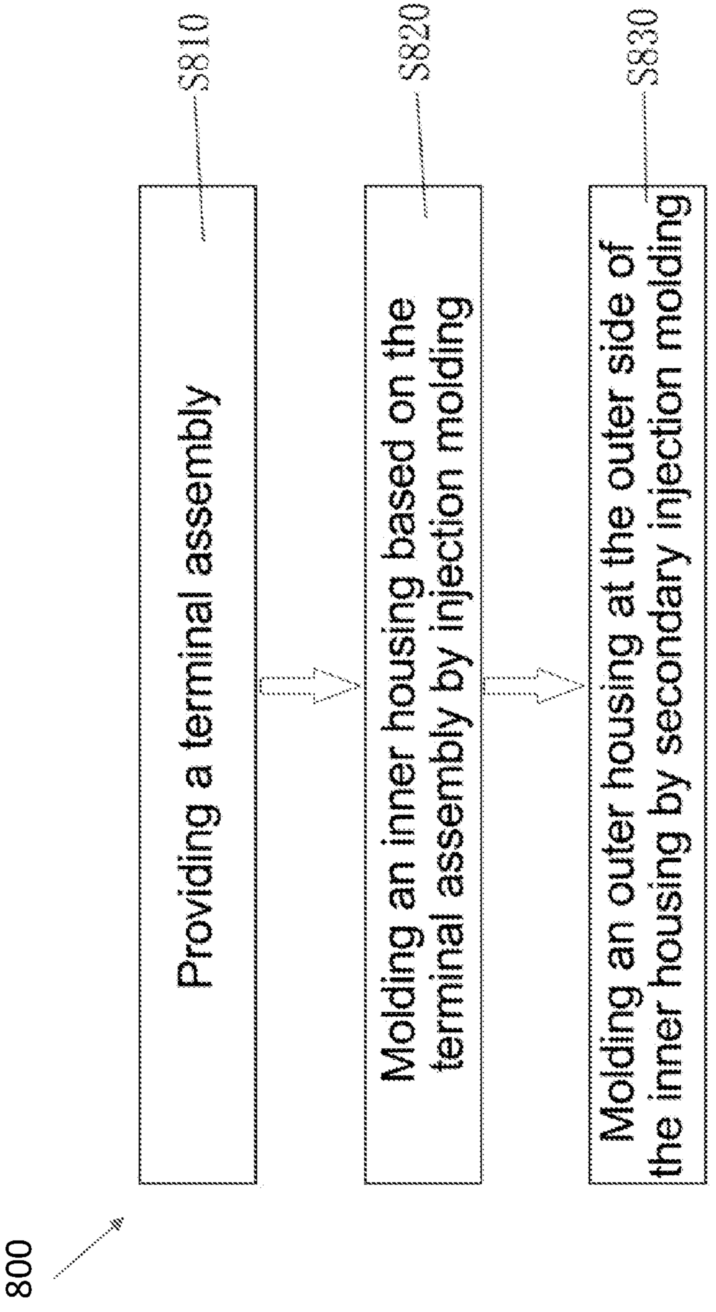
FIG. 8 is a flow chart illustrating a method of manufacturing an electrical connector, according to some embodiments.

FIG. 8 show a method 800 for manufacturing the electrical connector 1. The method 800 for manufacturing the electrical connector may comprise acts S810 to S830.

In Act S810, a plurality of conductive elements 10 may be provided, comprising arranging a plurality of conductive elements in an array. The array may include a first plurality of conductive elements 11 and a second plurality of conductive elements 12 arranged opposite to the first plurality of conductive elements 11, such that each of the first plurality of conductive elements 11 and the second plurality of conductive elements 12 comprises a first mating end, a second mating end, and an intermediate portion. The intermediate portion may extend between the first mating end and the second mating end, and connect the first mating end to the second mating end, as shown in FIGS. 1 and 2.

In Act S820, an inner portion 20 of the housing may be molded over the plurality of conductive elements 10 by injection molding, such that the inner portion 20 of the housing is shaped with a sidewall extending in a vertical direction and defining a space inside, and a divider 23 which extends in a direction substantially perpendicular to the vertical direction and is connected to the sidewall so as to divide the space into a first slot S1 and a second slot S2 in a direction substantially perpendicular to the vertical direction. In the molded assembly, the first plurality of conductive elements 11 may be embedded between the first sidewall 21 and the divider 23, of the inner portion 20 of the housing, and the second plurality of conductive elements 12 may be embedded between the second sidewall 22 opposite to the first sidewall 21 and the divider 23, of the inner portion 20 of the housing. The first mating end 111 of the first plurality of conductive elements 11 and the first mating end 121 of the second plurality of conductive elements 12 are exposed to the first slot S1, and the second mating end 112 of the first plurality of conductive elements 11 and the second mating end 122 of the second plurality of conductive elements 12 are exposed to the second slot S2.

In Act S830, an outer portion 30 of the housing may be molded over the outer side of the inner portion 20 of the housing by a secondary injection molding, such that the outer portion 30 of the housing is sleeved to the inner portion 20 of the housing.

According to the above technical solution of the present application, the electrical connector can be made by a two-step injection molding process. This manufacturing process may allow the shape of the housing to be adapted as needed to accommodate a variety of mounting requirements, and thus allowing for customized production required by a user to improve production flexibility, and significantly reduce the manufacturing cost.

Optionally, Act S810 may comprise configuring a bending portion on the first mating end and the second mating end of each of the first plurality of conductive elements 11 and the second plurality of conductive elements 12 in a direction perpendicular to the vertical direction that bends away from the slot. With the bending portions, the molding material may be filled between two bending portions of each of the first plurality of conductive elements 11 and the second plurality of conductive elements 12 during the molding process, thereby enabling the plurality of conductive elements to be fixed in the vertical direction.

Optionally, Act S820 may comprise configuring an end of the first sidewall 21 of the inner portion 20 of the housing located proximally in the vertical direction to have a first proximal end 211 having a shape that forms a positive fit with the bending portion of the first mating end 111 of the first plurality of conductive elements 11; configuring an end of the first sidewall 21 of the inner portion 20 of the housing located distally in the vertical direction to have a first distal end 212 having a shape that forms a positive fit with the bending portion of the second mating end 112 of the first plurality of conductive elements 11; configuring an end of the second sidewall 22 of the inner portion 20 of the housing located proximally in the vertical direction to have a second proximal end 221 having a shape that forms a positive fit with the bending portion of the first mating end 121 of the second plurality of conductive elements 12, and configuring an end of the second sidewall 22 of the inner portion 20 of the housing located distally in the vertical direction to have a second distal end 222 having a shape that forms a positive fit with the bending portion of the second mating end 122 of the second plurality of conductive elements 12.

Optionally, Act S810 may further comprise forming each conductive element of each of the first plurality of conductive elements 11 and the second plurality of conductive elements 12 into a long rib-shaped plate which comprises a body portion 50 extending in the vertical direction and bending portions 52, 53 bending at opposite ends of the body portion 50, the bending portions being bent away from the space in a direction perpendicular to the vertical direction.

Optionally, Act S810 may further comprise configuring the body portion 50 to have a first portion 51 located in the middle portion of the body portion 50 and second portions 54, 54' that may taper from opposite ends of the first portion 51 toward a corresponding bending portion respectively and extend to the corresponding bending portion.

Optionally, Act S810 may further comprise configuring a third portion 55 between the bending portion 52 and the second portion 54 of each conductive element, and configuring a third portion 55' between the bending portion 53 and the second portion 54' of each conductive element, with the third portions 55, 55' configured to be recessed in a direction substantially parallel to a bending direction of the bending portion.

Optionally, Act S820 may further comprise configuring at least one flange on an outer side of the sidewall of the inner portion 20 of the housing that protrudes outward from the sidewall in a direction away from the slot.

Optionally, Act S830 may comprise providing a support member 40, 40', and molding the outer portion 30 of the housing over the support member 40, 40' outer portion 30 of the housing during the secondary injection molding.

Having thus described several aspects of several embodiments, it is to be appreciated that various alterations, modifications, and improvements will readily occur to those skilled in the art. Such alterations, modifications, and improvements are intended to be part of this disclosure and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between 10±d1 and 20±d2" in some embodiments. The amount of variation d1, d2 for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation d1, d2 for a value could be as high as 50%. For example, if an operable range extends from 2 to 200, "approximately 80" may encompass values between 40 and 120 and the range may be as large as between 1 and 300. When only exact values are intended, the term "exactly" is used, e.g., "between exactly 2 and exactly 200." The term "essentially" is used to indicate that values are the same or at a target value or condition to within ±3%.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. For example, a process, method, system, product or device that contains a series of steps or units need not be limited to those steps or units that are clearly listed, instead, it may include other steps or units that are not clearly listed or are inherent to these processes, methods, products or devices. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

In the claims, as well as in the specification above, use of ordinal terms such as "first," "second," "third," etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An electrical connector comprising:

a housing comprising a divider with a first mating interface on a first side and a second mating interface on a second side; and a plurality of conductive elements, each of the plurality of conductive elements comprising a first mating end disposed in the first mating interface, a second mating end disposed in the second mating interface, and an intermediate portion at least partially held by the divider such that the first mating interface and the second mating interface are sealed from each other at least partially by the divider, wherein:

each of the plurality of conductive elements comprises a body portion that is straight;

the body portion comprises a first portion and second portions extending from opposite ends of the first portion toward respective bending portions; and the second portions are narrower than the first portion.

2. The electrical connector of claim 1, wherein:

the housing comprises an inner portion and an outer portion at least partially surrounding the inner portion such that the first mating interface and the second mating interface are disposed on opposite sides of the outer portion of the housing.

3. The electrical connector of claim 2, wherein, for each of the plurality of conductive elements:

each of the first mating end and the second mating end comprises a bending portion bending away from a respective one of the first mating interface and the second mating interface.

4. The electrical connector of claim 3, wherein:

the second portions are embedded between the divider and a respective one of a first sidewall and a second sidewall of the housing.

5. The electrical connector of claim 4, wherein:

the inner portion of the housing comprises a plurality of openings extending through a respective one of the first sidewall and the second sidewall;

the plurality of openings of the inner portion of the housing are disposed corresponding to the first portions of the body portions of pairs of conductive elements of the plurality of conductive elements; and the outer portion of the housing comprises corresponding portions that fill in the plurality of openings of the inner portion of the housing.

6. The electrical connector of claim 2, wherein:

the inner portion of the housing comprises first and second flanges protruding away from opposite sides of the plurality of conductive elements; and the outer portion of the housing comprises an internal profile for being fixedly connected to the first and second flanges.

7. The electrical connector of claim 2, comprising:

a support member embedded in the outer portion of the housing.

8. The electrical connector of claim 1, wherein, for each of the plurality of conductive elements:

the body portion comprises third portions disposed between respective bending portions and second portions, and the third portions are recessed from the second portions.

9. An electrical connector comprising:

a plurality of conductive elements, each of the plurality of conductive elements comprising a first mating end and a second mating end opposite the first mating end;

a housing holding the plurality of conductive elements, the housing comprising a first sidewall, a second sidewall, a space between the first sidewall and the second sidewall, the space configured to receive mating components to the electrical connector, and an outer portion at least partially surrounding both the first sidewall and the second sidewall; and a support member embedded in the outer portion of the housing and at least partially surrounding both the first sidewall and the second sidewall.

10. The electrical connector of claim 9, wherein:

each of the plurality of conductive elements comprises a body portion that is straight;

the body portion comprises a first portion and second portions extending from opposite ends of the first portion toward respective bending portions; and the second portions are narrower than the first portion.

11. The electrical connector of claim 9, wherein:

the support member comprises a plurality of hollow holes.

12. The electrical connector of claim 9, wherein:

the support member comprises a plurality of protrusions arranged at intervals along an outer edge and/or inner edge.

13. The electrical connector of claim 12, wherein:

the outer portion of the housing comprises a plurality of projections and gaps between adjacent projections.

14. The electrical connector of claim 13, wherein:

a portion of the plurality of protrusions of the support member at least partially extends out of the outer portion of the housing through respective gaps.

15. The electrical connector of claim 9, wherein:

the support member comprises a single metal piece, or a plurality of separated metal pieces.

16. The electrical connector of claim 9, wherein:

the plurality of conductive elements comprise a first plurality of conductive elements lining against the first sidewall, and a second plurality of conductive elements lining against the second sidewall.

17. An electronic system comprising:

a casing enclosing a space, the casing comprising a wall having an opening; and an electrical connector comprising:

a housing comprising:

an inner portion having a first mating interface disposed on a first side of the wall of the casing and a second mating interface on a second side of the wall of the casing, an outer portion at least partially disposed on the wall of the casing; and a support member at least partially embedded in the outer portion of the housing of the electrical connector, the support member comprising a plurality of angled portions arranged to collectively at least partially surround the inner portion of the housing.

18. The electronic system of claim 17, wherein:

the support member comprises a plurality of protrusions arranged at intervals along an outer edge and/or inner edge comprises.

19. The electronic system of claim 17, wherein:

the wall of the casing comprises a groove surrounding the opening;

the electronic system comprises a sealing member disposed in the groove and configured to hermetically seal an interface between the wall of the casing and the electrical connector; and the sealing member is between the wall of the casing and the outer portion of the housing of the electrical connector.

20. The electronic system of claim 19, wherein:

the electrical connector comprises a plurality of conductive elements, each of the plurality of conductive elements comprising a first mating end disposed in the first mating interface, and a second mating end disposed in the second mating interface.

* * * * *